United States Patent
Garrett et al.

(10) Patent No.: US 6,737,159 B2
(45) Date of Patent: May 18, 2004

(54) CONTROLLING SOLAR RADIATION IN SAFETY GLASS LAMINATES

(75) Inventors: Paul D. Garrett, Sturbridge, MA (US); Arno Boehm, Mannheim (DE); Howard D. Booth, Jr., Westfield, MA (US)

(73) Assignee: Solutia, Inc., St. Louis, MO (US)

( * ) Notice: Subject to any disclaimer, the term of this patent is extended or adjusted under 35 U.S.C. 154(b) by 21 days.

(21) Appl. No.: 10/102,905

(22) Filed: Mar. 22, 2002

(65) Prior Publication Data

US 2002/0182422 A1 Dec. 5, 2002

Related U.S. Application Data

(60) Provisional application No. 60/278,096, filed on Mar. 23, 2001.

(51) Int. Cl.$^7$ .............................................. B32B 17/10
(52) U.S. Cl. ..................... 428/332; 428/213; 428/215; 428/220; 428/328; 428/436; 428/437; 523/137; 524/90
(58) Field of Search ................................. 428/220, 213, 428/215, 332, 328, 437, 436; 523/137; 524/90

(56) References Cited

U.S. PATENT DOCUMENTS

| | | |
|---|---|---|
| 2,904,844 A | 9/1959 | Smithies |
| 2,909,810 A | 10/1959 | Jensch |
| 3,652,303 A | 3/1972 | Janakirama Rao ............ 106/52 |
| 3,841,890 A | 10/1974 | Coaker et al. ............... 106/316 |
| 3,922,456 A | 11/1975 | Baldridge ................... 428/203 |
| 3,944,352 A | 3/1976 | Morgan ........................ 353/55 |
| 3,982,984 A | 9/1976 | Baldridge ................... 156/244 |
| 3,994,654 A | 11/1976 | Chyu .......................... 425/376 |
| 4,144,217 A | 3/1979 | Snelgrove et al. .......... 260/31.8 |
| 4,281,980 A | 8/1981 | Hoagland et al. ........... 425/461 |
| 4,557,980 A | 12/1985 | Hodnett, III ................. 428/336 |
| 4,575,540 A | 3/1986 | Cartier ...................... 525/328.7 |
| 5,013,779 A | 5/1991 | Fariss et al. ................. 524/314 |
| 5,091,258 A | 2/1992 | Moran ......................... 428/437 |
| 5,137,954 A | 8/1992 | DasGupta et al. ........... 524/284 |
| 5,405,962 A | 4/1995 | Muellen et al. ............... 546/27 |
| 5,830,568 A | 11/1998 | Kondo ........................ 428/328 |
| 5,932,329 A | 8/1999 | Frost et al. .................. 428/214 |
| 5,986,099 A | 11/1999 | Mullen et al. ................. 546/26 |
| 6,124,458 A | 9/2000 | Muellen et al. ............... 546/38 |

FOREIGN PATENT DOCUMENTS

| | | |
|---|---|---|
| DE | 19940708 A1 | 3/2001 |
| EP | 0 185 863 A1 | 7/1986 |
| EP | 1 008 564 A1 | 6/2000 |
| JP | 59152249 | 8/1984 |
| JP | 05213637 | 8/1993 |
| JP | 8217500 | 8/1996 |
| WO | WO 0052099 | 9/2000 |
| WO | WO 0143963 | 6/2001 |

OTHER PUBLICATIONS

Geerts et al: "Quaterrylenebis (Dicarboximide) Near Infrared Absorbing and Emitting Dyes." Journal of Materials Chemistry, vol. 8, No. 11, Nov. 1998, pp. 2357–2369, ISSN 0959–9428.

Quante H. et al: "Quaterrylenebis (Dicarboximides)" Angewandte Chemie. International Edition, Verlag Chemie. Wienheim, DE, vol. 4, No. 12, Jul. 7, 1995, pp. 1323–1325, XP 002002793.

*Primary Examiner*—D. S. Nakarani
(74) *Attorney, Agent, or Firm*—Fitzpatrick, Cella, Harper & Scinto

(57) ABSTRACT

Plasticized polyvinyl butyral sheet containing dispersed therein, an infrared-absorbing effective amount of at least one quaterrylenetetracarboxylic diimide infrared-absorbing additive of formula I in the specification. A glass laminate having visible light transmitting and infrared light absorbing properties contains such sheet sandwiched between glass layers.

25 Claims, 1 Drawing Sheet

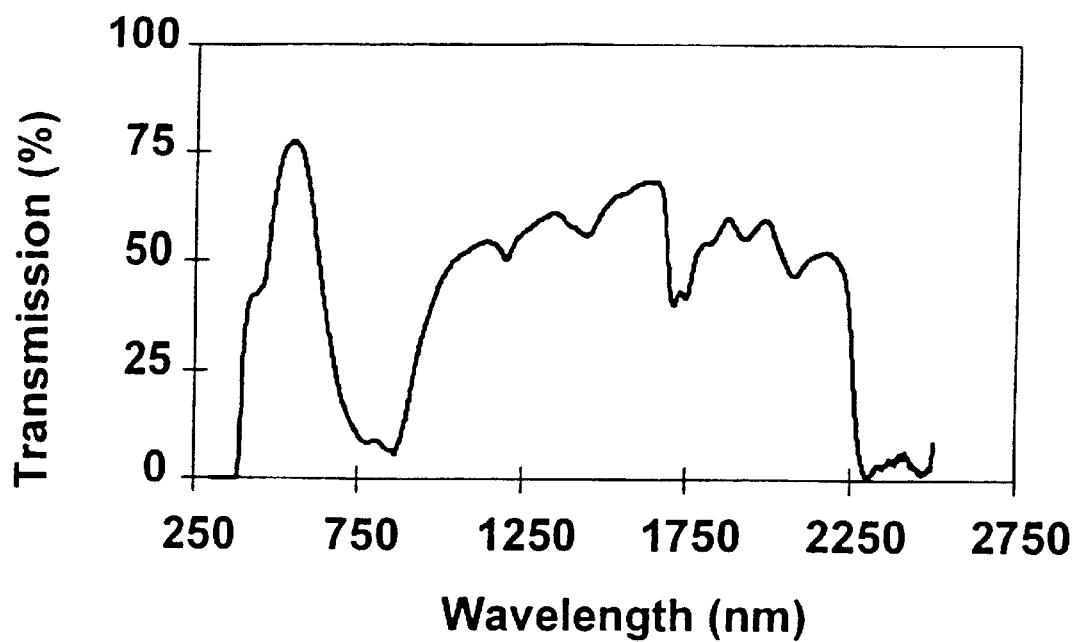

CONTROLLING SOLAR RADIATION IN SAFETY GLASS LAMINATES

CROSS REFERENCE TO RELATED APPLICATIONS

This application claims the benefit of U.S. Provisional Application No. 60/278,096, filed on Mar. 23, 2001.

BACKGROUND OF THE INVENTION

1. Field of the Invention

This invention relates to plasticized polyvinyl butyral (PVB) sheet containing dispersed heat absorbing additives and to a glass laminate containing such sheet.

2. Related Background Art

Laminated safety glass containing shock-dissipating sheet of plasticized PVB between two glass layers is widely used in vehicle and building windows where the PVB sheet functions to absorb the blow from the head of an occupant within a vehicle containing the window or from a foreign object from outside the window without penetrating the safety glass laminate. It is also known to disperse minor quantities of functional additives in the PVB sheet formulation to selectively absorb heat-producing infrared (IR) solar radiation while not hampering the transmission of visible light through the glass laminate containing such PVB sheet. With sheet containing such additives, excessive heating and physical damage to an interior area surrounded by the laminated glass (such as the interior of a vehicle parked in the sun) is thus avoided. In this regard, U.S. Pat. No. 5,830,568, discloses inorganic and organic IR-absorbing additives in PVB sheet in a layered safety glass laminate.

U.S. Pat. Nos. 5,405,962 and 5,986,099, disclose quaterrylenetetracarboxylic diimide compounds and their preparation. The '962 patent discloses use of non-core substituted quaterrylene compounds as pigments or fluorescent dyes or as photoconductors. Uses for the core substituted diimide compounds of the '099 patent are disclosed also as pigments or fluorescent dyes particularly for coloring organic materials or organic/inorganic composites.

A need continues to exist for improvements in the art of selectively controlling solar radiation in safety glass laminates by means of the composition of the PVB sheet in such laminates.

SUMMARY OF THE INVENTION

Now improvements have been made in the composition of PVB sheets containing additives for selectively controlling solar radiation.

Accordingly, a principal object of this invention is to provide IR-heat absorbing and visible light transmitting properties in glass laminates where heat blocking is achieved by the formulation of the PVB sheet per se without requiring additional functional layers in the laminate to accomplish this, i.e., on the surfaces of either the glass layer(s) or by incorporation of specially coated films within the laminate.

A specific object is to provide plasticized PVB sheet containing one or more organic IR-absorbing additives which can be combined with glass in a safety glass laminate to provide improved heat insulating properties.

Other objects will in part be obvious and will in part appear from the following description and claims.

These and other objects are accomplished by providing plasticized polyvinyl butyral sheet containing an infrared-absorbing effective amount of at least one quaterrylenetetracarboxylic diimide of formula I:

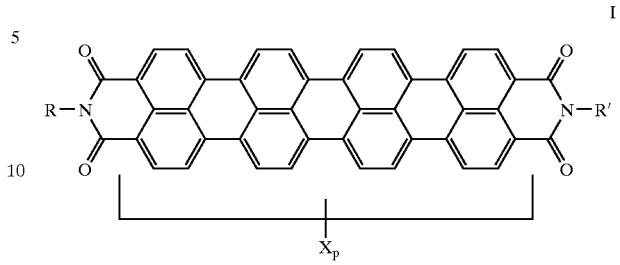

wherein

R and R' are independently $C_1$–$C_{30}$-alkyl whose carbon chain optionally is interrupted by one or more of —O—, —S—, —$NR^1$—, —CO— and/or —$SO_2$— and which optionally is monosubstituted or polysubstituted by cyano, $C_1$–$C_6$-alkoxy or a 5-, 6- or 7-membered heterocyclic radical which is attached via a nitrogen atom and which optionally contains additional heteroatoms and optionally is aromatic;

$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; or aryl or hetaryl, each of which optionally is monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which optionally is substituted by $C_1$–$C_{10}$-alkyl, $C_1$–$C_6$-alkoxy or halogen, where $R^1$ is hydrogen or $C_1$–$C_6$-alkyl; and $R^2$ is hydrogen; $C_1$–$C_{18}$-alkyl; aryl or hetaryl, each of which optionally is substituted by $C_1$–$C_6$-alkyl, $C_1$–$C_6$-alkoxy, halogen or cyano;

X is independently halogen; $C_1$–$C_{18}$-alkyl, aryloxy, arylthio, hetaryloxy or hetarylthio, each of which may be substituted by $C_1$–$C_4$-alkyl, or $C_1$–$C_{18}$-alkoxy; or

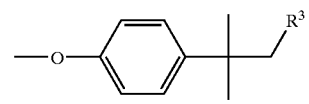

where $R^3$ is $C_1$–$C_8$-alkyl, whose carbon chain may be interrupted by one or more groups selected from the group consisting of —O—, —S—, —NR—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic; or $C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl;

and p is from 0–16.

In a particularly preferred embodiment of the invention the quaterrylenetetracarboxylic diimide is a tert-alkylphenoxy-substituted quaterrylenetetracarboxylic diimide infrared-absorbing additive of formula II:

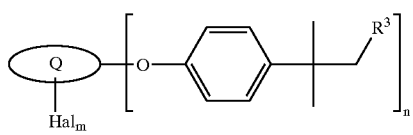

where
Q is a N,N'-disubstituted quaterrylene-3,4:13,14-tetracarboxylic diimide radical as described above;
$R^3$ is the same as defined above;
Hal is chloro and/or bromo;
m is from 0 to 15; and
n is from 1 to 16, subject to the proviso that the sum m+n is ≦16.

The PVB sheet of this invention may also include one or more inorganic IR-absorbing additives such as nanoparticulate lanthanum hexaboride, antimony tin oxide, indium tin oxide and mixtures thereof. Colorants, e.g., pigments and dyes, UV stabilizers and adhesion control agents may also be included in the PVB sheet of this invention.

This invention is also directed to a laminate having two glass sheets with the above-described PVB sheet disposed therebetween. The laminate of this invention may also include two or more PVB sheets interposed between the glass sheets. For example, a laminate may have one PVB sheet containing an IR absorbing effective amount of quaterrylimide and a second PVB sheet containing one or more of an inorganic IR-absorbing additive. In addition, the laminates of this invention may include a functional PET film interposed between two sheets of PVB so long as the quaterrylimide present in either one PVB sheet alone or both PVB sheets together is an IR absorbing effective amount of quaterrylimide.

BRIEF DESCRIPTION OF THE DRAWING

In describing the overall invention, reference will be made to the accompanying drawing which is a plot of intensity versus wavelength of solar radiation passing through a glass laminate of the invention containing PVB sheet of the invention.

DETAILED DESCRIPTION OF THE INVENTION

The quaterrylenetetracarboxylic diimide (hereinafter sometimes called "quaterrylimide") IR-absorber for incorporation as an additive into the formulation of PVB sheet according to this invention is of formula I.

A particularly preferred IR-absorber is the tert-alkylphenoxy-substituted quaterrylenetetracarboxylic diimide (hereinafter sometimes called "tert-alkylphenoxy-substituted quaterrylimide") described by formula II.

The tert-alkylphenoxy radicals characterizing the compounds II and also any halogen atoms present in addition may be attached directly or via aryl substituents to the polycyclic core of the quaterrylimide. It will be appreciated that both forms of attachment can occur in one and the same compound II. If present, the aryl substituents are resistant to base attack, and include, for example, unsubstituted or alkyl- and/or alkoxy-substituted aryl, especially phenyl, or hetaryl, such as 2-, 3- and 4-pyridyl and pyrimidyl. These aryl substituents can either be attached directly to the polycyclic core or the imide nitrogen atoms. Preferably the quaterrylimides of formula II, bear the tert-alkylphenoxy radicals directly on the polycyclic core or have at least directly attached tert-alkylphenoxy radicals in addition to arylene-attached tert-alkylphenoxy radicals.

The compounds II contain from at least 1 to 16 (n: 1–16), especially 2 to 8, tert-alkylphenoxy radicals.

The compounds of II are prepared by introducing the tert-alkylphenoxy radicals into the quaterrylimides by replacement of halogen. Accordingly, if not all the halogen atoms are replaced, the compounds II can also contain up to 15 (m: 0–15), especially from 1 to 4, halogen atoms, in which case the total number of the two substituent groups should not exceed 16, preferably 8.

Generally the range of m+n for compound II will be 1–16 and preferably 2–8.

When the quaterrylimide radical contains additional aryl substituents not used for attaching tert-alkylphenoxy, the maximum for the sum m+n decreases accordingly, of course.

Suitable examples of the $R^3$ radicals appearing in formula II and also of their substituents include methyl, ethyl, propyl, isopropyl, butyl, isobutyl, tert-butyl, pentyl, isopentyl, neopentyl, tert-pentyl, hexyl, 2-methylpentyl, tert-pentyl, hexyl, 2-methylpentyl, heptyl, 1-ethylpentyl, octyl, 2-ethylhexyl and isooctyl;

2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl and 3,6,9-trioxaundecyl;

2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 4,7-dithiaoctyl, 4,7-dithianonyl, 2- and 4-butylthiobutyl, 4,8-dithiadecyl, 3,6,9-trithiadecyl and 3,6,9-trithiaundecyl;

2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-monomethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl and 3,6,9-trimethyl-3,6,9-triazaundecyl;

propan-2-on-1-yl, butan-3-on-1-yl, butan-3-on-2-yl and 2-ethylpentan-3-on-1-yl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl.

Examples of preferred tert-alkoxyphenoxy radicals are p-(1,1-dimethylpropyl)phenoxy, p-(1,1-dimethylbutyl)phenoxy, p-(1,1-dimethylpentyl)phenoxy, p-(1,1,3,3-tetramethylbutyl)phenoxy, p-(2-cyclopentyl-1,1-dimethylethyl)phenoxy, p-(2-cyclohexyl-1,1-dimethylethyl)phenoxy, p-(2-cycloheptyl-1,1-dimethylethyl)phenoxy and p-(1,1-dimethyl-2-(4-morpholinyl)ethyl)phenoxy.

The quaterrylimide radicals of compound II will generally bear the following base-stable substituents on the imide nitrogen atoms, i.e., preferably the R groups of formula I are independently:

$C_6$–$C_{30}$-alkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic;

$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; or aryl or hetaryl which may be monosubstituted or polysubstituted by $C_1$–$C_{18}$-alkyl, $C_1$–$C_6$-alkoxy, cyano, —CONH— $R^1$ and/or —NH—$COR^1$.

The following radicals may be specifically mentioned by way of example for these substituents, i.e., as preferred R and R' groups on the imide nitrogen atoms of the quaterrylimide, in addition to the radicals already mentioned:

nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the designations isononyl, isodecyl and isotridecyl as well as the above mentioned designation isooctyl are trivial names derived from the alcohols obtained by the oxo process);

3,6,9-trioxadodecyl, 3,6,9,12-tetraoxatridecyl and 3,6,9,12-tetraoxatetradecyl; 3,6,9-trithiadodecyl, 3,6,9,12-tetrathiatridecyl and 3,6,9,12-tetrathiatetradecyl;

carbamoyl, methylaminocarbonyl, ethylaminocarbonyl, propylaminocarbonyl, butylaminocarbonyl, pentylaminocarbonyl, hexylaminocarbonyl, heptylaminocarbonyl, octylaminocarbonyl, nonylaminocarbonyl and decylaminocarbonyl; formylamino, acetylamino and propionylamino;

2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-propylphenyl, 2,4-, 2,5-, 3,5- and 2,6-dipropylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-diisobutylphenyl, 2,4,6-triisobutylphenyl, 2-, 3- and 4-sec-butylphenyl, 2,4-, 2,5-, 3,5- and 2,6-di-sec-butylphenyl, 2,4,6-tri-sec-butylphenyl, 2-, 3- and 4-tert-butylphenyl, 2,4-, 2,5-, 3,5- and 2,6-di-tert-butylphenyl and 2,4,6-tri-tert-butylphenyl; 2-, 3- and 4-methoxyphenyl, 2,4-, 2,5-, 3,5- and 2,6-dimethoxyphenyl, 2,4,6-trimethoxyphenyl, 2-, 3- and 4-ethoxyphenyl, 2,4-, 2,5-, 3,5- and 2,6-diethoxyphenyl, 2,4,6-triethoxyphenyl, 2-, 3- and 4-propoxyphenyl, 2,4-, 2,5-, 3,5- and 2,6-dipropoxyphenyl, 2-, 3- and 4-isopropoxyphenyl, 2,4-, 2,5-, 3,5- and 2,6-diisopropoxyphenyl and 2-, 3- and 4-butoxyphenyl; 2-, 3- and 4-cyanophenyl; 3- and 4-carboxamidophenyl, 3- and 4-N-(methyl)carboxamidophenyl and 3- and 4-N-(ethyl)carboxamidophenyl; 3- and 4-acetylaminophenyl, 3- and 4-propionylaminophenyl and 3- and 4-butyrylaminophenyl.

The preparation of various quaterrylenetetracarboxylic diimides is described in U.S. Pat. No. 5,405,962 and U.S. Pat. No. 5,986,099, the disclosure of both of which are incorporated by reference herein. The tert-alkylphenoxy substituted quaterrylimides of formula II may be prepared by reacting the corresponding halides of the formula III

III with tert-alkylphenols of the formula IV

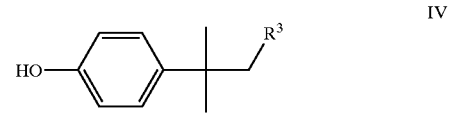

IV in an inert basic nitrogen-containing solvent in the presence of a base and if desired subsequently removing unwanted halogen.

Useful inert basic nitrogen-containing solvents are in particular polar solvents, especially nitrogen-containing heterocycles, such as pyridine, pyrimidine, quinoline, isoquinoline, quinaldine and preferably N-methylpyrrolidone, and also carboxamides, such as N,N-dimethylformamide and N,N-dimethylacetamide.

The solvent quantity depends on the solubility of the halide III and is customarily in the range from 2 to 40 g, preferably from 4 to 25 g, of solvent per g of halide III.

Useful bases are in particular nonnucleophilic or only weakly nucleophilic compounds. Examples of such bases are alkali metal hydroxides, such as potassium hydroxide and sodium hydroxide, alkali metal carbonates, such as potassium carbonate and sodium carbonate, and also alkali metal alkoxides of tertiary alcohols, such as lithium tert-butoxide, sodium tert-butoxide and potassium tert-butoxide, which are used in anhydrous form.

In general, from 0.8 to 1.5, preferably from 1.0 to 1.2, molar equivalents of base are used per mole of halogen atom to be replaced.

The halides III used as starting materials are generally known or obtainable according to known methods by reacting the unhalogenated quaterrylimide with halogenating agents, especially the elemental halogens. Such halides III that contain halogen atoms attached to aryl substituents are known to be generally obtainable by introduction of the halogenated aryl radicals into the polycyclic system of the quaterrylimide.

The molar ratio of halide III to phenol IV depends on the number of halogen atoms to be replaced. In general, from 1 to 2, preferably from 1 to 1.3, mol of phenol IV is used per mole of halogen atom to be replaced in halide III.

The reaction temperature is customarily in the range from 50 to 200° C., preferably at from 60 to 140° C.

It is advisable for the reaction to be carried out under protective gas, for example nitrogen or argon.

The reaction time depends on the reactivity of the halide III and is about 2–48 h.

Varying the reaction conditions—amount of phenol IV and base and the reaction temperature—advantageously provides control over the halogen replacement, so that it is no problem to prepare not only compounds II where all the halogen atoms have been replaced (m=0) but also compounds II which do contain halogen. If desired, the halogen can subsequently be removed from the compound II. Thus, a single starting material III can be used, if desired, to prepare various compounds II.

The process is advantageously carried out by initially charging the solvent, adding halide III, phenol IV and base and heating the resulting solution or suspension to the desired reaction temperature for 2–48 h while stirring under protective gas.

After cooling down to room temperature, the reaction product can be isolated by filtering off the precipitated reaction product directly or after dilution with 3 to 4 times the volume of water, a dilute inorganic acid, for example 5–10% by weight hydrochloric acid, or an aliphatic alcohol, for example methanol, washing first with a little solvent and then with water to neutral run-off and drying under reduced pressure.

In some cases, especially in order to obtain high degrees of substitution or in the case of the bromides III, which are more base-labile and hence more prone to undesirable secondary reactions, it can be advantageous for high product purity for the phenoxylation reaction to be carried out in two stages. In this case, the halide III is initially reacted with only a portion, advantageously the amount needed to replace the most labile halogen substituents, of phenol IV and base, the partially phenoxylated product is separated from the reaction mixture by filtration and is subsequently reacted with the rest of phenol IV and base to form the desired product.

In general, the compounds II obtained as described above have a sufficiently high assay (>95%) that there is no need for further purification. Analytically pure products can be prepared by recrystallization from aromatic solvents, such as toluene and xylene, or halogenated hydrocarbons, such as methylene chloride and chloroform, or by filtration of a solution of the products in these solvents through silica gel and subsequent concentrating.

If only part of the halogen substituents were replaced and the halogen still present is to be removed, this can be done by means of known methods.

By way of example, two dehalogenations will now be described which would be very advantageous for this purpose.

In the first method, the dehalogenation is base-induced in the presence of an inert basic nitrogen-containing or aromatic solvent.

Useful bases for this purpose include for example alkali metal hydroxides, such as potassium hydroxide and sodium hydroxide, alkali metal carbonates, such as potassium carbonate and sodium carbonate, alkali metal alkoxides of secondary and tertiary alcohols such as lithium isopropoxide, sodium isopropoxide, potassium isopropoxide, lithium tert-butoxide, sodium tert-butoxide and potassium tert-butoxide, and also sterically hindered nitrogen bases, such as diazabicyclooctane (DABCO), diazabicyclononene (DBN) and diazabicycloundecene (DBU).

The amount of base is not critical as such. It is customary to use from 1 to 3, preferably from 1 to 1.5, mol equivalents of base per mole of halogen atom to be eliminated.

Useful solvents include not only aromatic solvents, such as toluene and xylene, but also the same solvents as used in the phenoxylation, the use level of which in turn depends on the solubility of the compound I to be dehalogenated and is generally in the range from 2 to 50 g, preferably in the range from 5 to 25 g, per g of compound I.

The reaction temperature is customarily in the range from 50 to 200° C., preferably from 60 to 130° C.

It is advisable for the dehalogenation to be carried out under protective gas, for example nitrogen or argon.

The reaction time depends on the reactivity of the compound I to be dehalogenated and is about 1–6 h.

The process is advantageously carried out by initially charging a solution or suspension in the solvent of the compound I to be dehalogenated, adding the base and heating the resulting mixture to the desired reaction temperature for 1–6 h while stirring under protective gas.

When there is a risk of undesirable secondary reactions, for example saponifications, it is advantageous for the base not to be added until after heating to reaction temperature.

After cooling down to room temperature, the reaction product can be isolated by diluting the reaction mixture with from 3 to 4 times the volume of a dilute inorganic acid, for example 5–10% by weight hydrochloric acid, filtering off the thusly precipitated product, washing initially with the dilute acid and then with methanol or water to neutral run-off and drying under reduced pressure.

The second method comprises a transition metal catalyzed reductive dehalogenation in the presence of a solvent that is inert under the reaction conditions.

The reducing agents used here are preferably complex hydrides, especially aluminohydrides, such as lithium aluminohydride, and especially borohydrides, preferably sodium borohydride, or elemental hydrogen.

The amount of reducing agent is not critical as such. Generally from 1 to 5, preferably from 2 to 3, mol equivalents of reducing agent are used per mole of halogen atom to be eliminated.

Useful transition metal catalysts include in particular palladium compounds, such as Pd(II) and Pd(0) compounds.

The reduction with complex hydrides is pre-ferably catalyzed using palladium(II) acetate, di-chloro(1,5-cyclooctadiene)palladium(II), dichloro[1,1'-bis(diphenylphosphino)ferrocene]palladium(II), tris(dibenzylideneacetone)dipalladium(0), tetrakis(triphenylphosphine)palladium(0) and tetrakis(tris-o-tolylphosphine)palladium(0) and the reduction with elemental hydrogen is preferably catalyzed using palladium-doped activated carbon.

Generally from 0.5 to 2 mol % of catalyst are used per mole of halogen atom to be eliminated.

The choice of solvent depends on the choice of reducing agent. When complex hydrides are used, it is especially polar aprotic solvents, such as aliphatic and cycloaliphatic ethers, aromatic solvents and aliphatic nitrites, which are suitable, while it is especially aliphatic alcohols which are suitable if elemental hydrogen is used.

Specific examples of these solvents are diethyl ether, tetrahydrofuran and dioxane, toluene and xylene, acetonitrile, which is used with borohydrides in particular, and also methanol and ethanol.

The amount of solvent is determined by the solubility of the compound I to be dehalogenated and is generally in the range from 2 to 50 g, preferably in the range from 5 to 25 g, per g of compound I.

The reaction temperature is customarily in the range from 0 to 150° C., preferably in the range from 20 to 100° C., although the reduction with complex hydrides is generally carried out at higher temperatures (about 50–100° C.) than the reduction with elemental hydrogen.

When complex hydrides are used as reducing agents, it is advisable to work under protective gas. A hydrogenation with elemental hydrogen is advantageously performed under a small hydrogen overpressure.

Depending on the reactivity of compound I, the dehalogenation takes from 4 to 72 h.

The process for dehalogenating with complex hydrides is advantageously carried out by initially charging the solvent, adding the compound I to be dehalogenated and subsequently the hydride and the catalyst, and heating the resulting solution or suspension to the desired reaction temperature for 4–72 h while stirring under protective gas.

After cooling down to room temperature and destroying excess hydride by addition of water, the reaction product can be isolated as described for the base-induced dehalogenation.

The process for dehalogenating with elemental hydrogen is carried out by initially charging a hydrogenation reactor with a suspension, in the solvent, of the compound I to be dehalogenated and the catalyst and heating to the reaction temperature for 4–72 h while stirring under a small hydrogen overpressure (about 0.1–0.5 bar).

After cooling down to room temperature, depressurizing and displacing excess hydrogen with nitrogen, the reaction product can be isolated as already described.

To produce compounds I having a >95% assay, the as-dehalogenated compounds can be subjected to a purification step. Useful purification options include for example fractional crystallization from solvent mixtures with an aromatic solvent, such as toluene and xylene, or a halogenated hydrocarbon, such as methylene chloride, chloroform and 1,1,2,2-tetrachloroethane, as one component and an extremely nonpolar solvent, such as pentane or hexane, as the other component or column chromatography over silica gel using these solvent mixtures as mobile phase.

The quaterrylimide IR-absorber of formula I, and more preferably the tert-alkyphenoxy-substituted quaterrylimide IR-absorber of formula II, in solid form is incorporated into the formulation of the PVB sheet by first adding it as powder to liquid plasticizer for the PVB sheet with stirring at about 50° C. after which the stirred mixture along with any other sheet property-influencing additives, is combined with PVB resin to form a premix which is melted and homogenized in an intensive mixer and then shaped into sheet form.

The concentration of the quaterrylimide will vary depending on the application of the laminate, e.g. windscreen or architectural glass, target transmission range, PVB thickness and glass thickness. The glass thickness for architectural application will typically range from about 4.8 mm (3/16 inch) to about 12.7 mm (½ inch), and from about 1.6 mm to about 2.5 mm for a windscreen application. More particularly, for example, for a laminate having a PVB thickness of about 0.76 mm and a glass thickness of about 6 mm that is used as architectural glass, the quaterrylimide will generally be present in the PVB in an amount of about 0.003 to about 0.1 percent by weight, preferably about 0.005 to about 0.08 percent by weight, and most preferably 0.01 to about 0.06 percent by weight of the PVB. In general, a PVB layer used in a laminate for windscreen application will have lower concentrations of quaterrylimide then a PVB layer used in an architectural glass application due to regulations on visible transmittance for laminated automotive windscreens. For example, for a laminate having the PVB thickness of about 0.76 mm and a glass thickness of about 2.1 mm used as a windscreen, the quaterrylimide will generally be present in the PVB in an amount of about 0.003 to about 0.07 percent by weight, preferably about 0.005 to about 0.06 percent by weight, and most preferably about 0.01 to about 0.05 percent by weight of the PVB.

The particular quaterrylimide used in the PVB sheet of this invention should be compatible with the PVB, stable and have appropriate IR absorbing characteristics. Referring to formula I, it is generally believed that R has little influence on absorption wavelength, but has a strong influence on solubility, aggregation behavior and stability. For example, if R is short chain alkyl the quaterrylimide will have low solubility, a tendency to aggregation and high chemical and thermal stability. If R is longer chain alkyl, cycloalkyl, or unsubstituted phenyl, then the solubility will be much higher and the aggregation tendency low, but stability will be lower. Preferably, R is substituted phenyl or higher aryl or hetaryl. In this case the quaterrylimide will generally have high solubility, low aggregation tendency, strong sharp adsorption bands and high chemical and thermal stability.

The X group of formula I is believed to influence both absorption and compatibility, with generally little influence on thermal or chemical stability unless X is halo or (het)arylthio. For example, if X is hydrogen there is generally little influence on solubility or absorption, while if X is alkyl or alke(i)nyl this results in a slight enhancement of solubility and a small bathochromic shift in absorption wavelength. If X is halogen, this will result in a hypsochromic shift in absorption wavelength (to about 740–750 nanometers), while if X is (het)aryloxy this will cause a strong bathochromic shift of up to 35 nanometers, high chemical stability and a moderate enhancement of solubility without substitution or a strong enhancement of solubility with substitution on the (het)aryl moiety. If X is (het)arylthio, an even stronger bathochromic shift in absorption wavelength is expected than with (het)aryloxy, but the resulting quaterrylimide is likely to have reduced chemical and thermal stability. The above described effects caused by the selection of X will be more pronounced as p of formula I is made larger.

As previously noted, the PVB sheet of this invention may also contain an inorganic IR-absorber. Exemplary inorganic IR-absorbers are described in U.S. Pat. No. 5,830,568, the disclosure of which is incorporated by reference herein. Such absorbers include antimony tin oxide and indium tin oxide. Other useful inorganic IR-absorbers are metal hexaborides, such as lanthanum hexaboride, which are described in EP-A-1008564. The amount of inorganic IR-absorber added to the PVB will vary with the inorganic IR-absorber employed. For example, if indium tin oxide is used it will typically be present in a range of about 0.01 to 1.0 percent by weight of PVB, while antimony tin oxide will generally be present in a range of about 0.05 to about 1.5 percent by weight of PVB.

The preparation and physical properties of these inorganic IR-absorbers in solid powder form, their dispersion in the PVB sheet and the preparation of glass laminate containing such sheet are disclosed in Japanese Patent Application (Kokai) No. 8-217500. Briefly, to desirably promote visible light (wavelength 400 to 700 nm) transparency in the finished glass laminate, particles of the inorganic IR-absorber are 0.1 micrometer ($\mu$m) in diameter or less, preferably not greater than 0.02 $\mu$m. To minimize or avoid undesirable agglomeration of the inorganic IR additive particles which causes undesirable haze in the finished glass laminates, the particles are initially mixed with a macromolecular surfactant before dispersing in the plasticizer of the PVB sheet formulation.

The PVB sheet of this invention may also contain colorants such as dyes and pigments. The colorant may be admixed with the PVB or printed on the surface of the PVB sheet such as disclosed in U.S. Pat. Nos. 3,922,456 and 3,982,984. An exemplary pigment is copper phthalocyanine pigment blue available from Sigma-Aldrich Corp., St. Louis, Mo. An exemplary dye that may be used is C.I. solvent blue 102, available as "KEYSTONE BLUE RC" from Keystone Aniline Corp., Chicago, Ill.

Using the CIELAB system, a well known international standard for color measurement, the color of an object under fixed viewing conditions can be defined. A set of dimensionless coordinates $L^*$, $a^*$, $b^*$ are used to define a color's hue and intensity. These coordinates are measured according to instructions provided in the publication "Standard Practice for Computing the Colors of Objects by Using the CIE System," ASTM E 308-01. The wave-length range is between 400 nm and 700 nm, at a wavelength interval of 20 nm. The coordinate $L^*$ is used to measure the lightness or darkness of a color. White is denoted by $L^*=100$ and black is denoted by $L^*=0$. The coordinate $a^*$ measures the level of green or red color in the object, and the coordinate $b^*$ measures the level of blue or yellow in the object.

In a preferred embodiment, the colorants that are included produce a green color in the PVB sheet. The PVB sheet is typically placed between glass sheets forming a laminate. The color of the green colored PVB sheet or green colored laminate is defined by the CIELAB system, where $L^*$ is from about 76.0 to about 94.0, $a^*$ is from about $-38.0$ to about $-8.0$, and $b^*$ is from about $-5.0$ to about 7.0. Preferably, the green colored PVB sheet or green colored laminate has an $L^*$ value from about 86.0 to about 89.5, an $a^*$ value from about $-28.0$ to about $-15.0$, and a $b^*$ value from about $-1.0$ to about 4.5.

In another preferred embodiment, a gray color is produced by including the colorants in the PVB sheet. The gray colored PVB sheet or gray colored laminate formed by placing the gray colored PVB sheet between glass sheets has an $L^*$ value from about 59.0 to about 87.0, an $a^*$ value from about $-7.0$ to about 3.0, and a $b^*$ value from about $-8.0$ to about 2.0. More preferably, the gray colored PVB sheet or gray colored laminate has an $L^*$ value from about 69.5 to about 77.0, an $a^*$ value from about $-4.0$ to about 1.0, and a $b^*$ value from about $-5.0$ to about 0.5.

PVB resin of the sheet of this invention has a weight average molecular weight greater than 70,000, preferably about 100,000 to 250,000, as measured by size exclusion chromatography using low angle laser light scattering. On a weight basis PVB typically comprises less than 19.5%, preferably about 17 to 19% hydroxyl groups calculated as polyvinyl alcohol (PVOH); 0 to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

PVB resin is commercially available as Butvar® resin from Solutia, Inc. of St. Louis, Mo.

The PVB resin of the sheet of this invention is typically plasticized with about 20 to 80, more commonly 25 to 45, parts plasticizer per hundred parts resin. Plasticizers commonly employed are esters of a polybasic acid or a polyhydric alcohol. Suitable plasticizers are triethylene glycol di-(2-ethylbutyrate), triethylene glycol di-(2-ethylhexanoate), triethylene glycol diheptanoate, tetraethylene glycol dihepatanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as oil-modified sebacic alkyds, and mixtures of phosphates and adipates as disclosed in U.S. Pat. No. 3,841,890 and adipates such as disclosed in U.S. Pat. No. 4,144,217. Also mixed adipates made from $C_4$ to $C_9$ aldyl alcohols and cyclo $C_4$ to $C_1$ alcohols as disclosed in U.S. Pat. No. 5,013,779. $C_6$ to $C_8$ adipate esters such as hexyl adipate and triethylene glycol di-(2-ethylhexanoate) are preferred plasticizers.

Plasticized PVB sheet at a noncritical thickness of about 0.13 to 1.3 mm is formed by preferably (in commercial systems) extruding the mixed formulation through a sheet die, i.e. forcing molten, plasticized PVB through a horizontally long vertically narrow die opening substantially conforming in size to the sheet being formed, or by casting molten polymer issuing from an extrusion die onto a die roll in close proximity to the die exit to impart desired surface characteristics to one side of the polymer. When the roll surface has minute peaks and valleys, the side of the sheet contacting the roll will have a rough surface generally conforming to the valleys and peaks. Roughness on the other side can be provided by the design of the extrudate die opening as shown, for example, in FIG. 4 of U.S. Pat. No. 4,281,980. Other known techniques for producing a rough surface on one or both sides of an extruding sheet involve specifying and controlling one or more of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing downstream of the extrusion die also roughens the sheet surface. As known, this roughness is temporary to facilitate deairing during laminating after which elevated temperature and pressure during bonding of the sheet to glass melts it smooth. Lamination to glass is according to generally known procedures.

The PVB sheet of this invention preferably also contains ultraviolet light stabilizers. If used, the ultraviolet (UV) stabilizer will generally be present in a range of about 0.01 to 1.0 percent by weight of the PVB. The preferred amount of UV stabilizer will vary depending on the stabilizer employed. For example, "TINUVIN 328" available from Ciba Speciality Chemicals, Basel, Switzerland has been found to perform particularly well at a concentration of about 0.5 percent by weight of the PVB.

The sheet of the invention optionally contains other additives in addition to those defined above to enhance various performance properties; these include antioxidants, adhesion control salts and the like.

As noted previously, this invention is also directed to a laminate of two sheets of glass having the PVB sheet of this invention disposed therebetween. The sheets of glass may be any type of glass so long as it allows for visible light transmission. Such glass includes typical clear soda-lime glass, IR-reflective coated glass or IR-absorbing glass, which are well known. See e.g., U.S. Pat. No. 3,944,352 and U.S. Pat. No. 3,652,303, the disclosures of both of which are incorporated by reference. IR-absorbing glass is commercially available from PPG Industries, Inc., Pittsburgh, Pa. as "SOLARGREEN" glass and Pilkington PLC, St. Helens, UK as "OPTIKOOL" glass. It is also possible to place IR reflective films on the outer surface of one or both of the sheets of glass used in the laminate.

The laminate of this invention may include more than one sheet of PVB disposed between the two sheets of glass so long as the total amount of quaterrylimide in either one sheet of PVB alone or in a plurality of PVB sheets is an IR-absorbing effective amount of quaterrylimide. It should be apparent that if a plurality of PVB sheets are used only one need contain the quaterrylimide. A laminate may contain a sheet of PVB containing quaterrylimide and a second sheet containing at least one inorganic IR-absorber such as previously described. In yet another embodiment of this invention the laminate may include an IR-reflective layer such as IR-reflective polyethylene terephethalate (PET) layer. IR-reflective PET films in PVB laminates are described in U.S. Pat. No. 5,932,329 and U.S. Pat. No. 5,091,258, the disclosure of both of which are incorporated by reference herein. Preferably the IR-reflective PET film will be disposed between two PVB sheets. An exemplary IR reflective coated PET film is "XIR"-75 from Southwall Technologies, Inc., Palo Alto, Calif.

Preparation of laminates of two glass substrates with one or more PVB sheet inner layers is well known to those skilled in the art.

Another embodiment of this invention is directed to post applied film products for visible transparent substrates, wherein the film product contains an infrared-absorbing effective amount of at least one quaterrylenetetracarboxylic diimide of formula I. The post applied film product of this invention may be applied to architectural or automotive glass for solar infrared control or may be applied to display devices as a means of limiting the infrared output of such display devices.

In addition to the quaterrylenetetracarboxylic diimide of formula I, at a minimum, the film product of this invention is comprised of at least one film substrate and a post application adhesive layer disposed on a surface of said film substrate to provide adhesion of the film product to a visibly transparent glass substrate. The film product may also include a plurality of film substrates that have disposed therebetween a laminating adhesive. The film product of this invention may also include one or more protective coatings disposed on the outer surface of the film substrate. As used herein the outer surface of the film product is that which faces in a direction opposite of the surface of the film product having the post application adhesive layer thereon.

The quaterrylenetetracarboxylic diimide of formula I may be incorporated in one or more of the film substrate, the post application adhesive layer or when present, the laminating adhesive and/or protective coating of the film product. Typically, the film substrate used in the film product of this invention may be a polyester film, such as polyethyleneterphthalate (PET) or polyethylenenaphthalate (PEN), an acrylic film or a polycarbonate film. The post application adhesive layer may be an acrylic pressure sensitive adhesive or a polyester based adhesive. Similarly, the laminating adhesive, when used, may be a polyester or acrylic based adhesive. Of course, a laminated film product may have film substrates that differ in composition and the laminating adhesive and post application adhesive need not be the same. If a protective coating is present it will generally be a polyacrylate coating, most preferably a UV curable polyacrylate coating which forms a hard scratch resistant coating. The preparation of film products having protective coatings is described in U.S. Pat. No. 4,557,980, the entire disclosure of which is incorporated by reference herein. The amount of quaterrylenetetracarboxylic diimide of formula I employed in the film product of this invention to achieve infrared absorbtion is that amount which is effective to inhibit the transmission of infrared radiation through the film product.

The following Examples illustrate and do not limit or restrict the invention. Amounts and percentages are in weight.

Preparation of Tert-Alkylphenoxy-Substituted Quaterrylimides

EXAMPLE 1

A mixture of 28.6 g (20 mmol) of a 1:1 mixture of N,N'-bis(2,6-diisopropylphenyl)-1,6,8,11,16,18-hexabromoquaterrylene-3,4:13,14-tetracarboxylic diimide and N,N'-bis(2,6-diisopropylphenyl)-1,6,8,11,16,19-hexabromoquaterrylene-3,4:13,14-tetracarboxylic diimide, 32.2 g of para-tert-octylphenol, 9.95 g of potassium carbonate and 150 ml of N-methylpyrrolidone was heated to 95° C. for 10 h while stirring in a nitrogen atmosphere.

After cooling down to room temperature, the precipitated reaction product was filtered off directly, washed with a little N-methylpyrrolidone and subsequently washed with water to neutral run-off. For purification a column filtration with silica gel as stationary and methylene chloride as mobile phase was carried out. After removal of the solvent, the final product was dried at 100° C. under reduced pressure.

This reaction led to the complete replacement of the halogen atoms by the tert-alkylphenoxy radicals.

The total yield was 31 g (71%) of a 1:1 mixture of N,N'-bis(2,6-diisopropylphenyl)-1,6,8,11,16,18-hexa(p-tert-octylphenoxy)quaterrylene-3,4:13,14-tetracarboxylic diimide and N,N'-bis(2,6-diisopropylphenyl)-1,6,8,11,16,19-hexa(p-tert-octylphenoxy)quaterrylene-3,4:13,14-tetracarboxylic diimide.

EXAMPLE 2

A tert-alkylphenoxy-substituted quaterrylimide was prepared in a manner substantially similar to Example 1, except that the potassium carbonate was replaced with 13.5 g of potassium t-butoxide, the mixture included 200 ml of N-methylpyrrolidone and was heated to 80° C. for 4 h. The total yield was 28 g (64%) of a 1:1 mixture of N,N'-bis(2,6-diisopropylphenyl)-1,6,8,11,16,18-hexa(p-tert-octylphenoxy)quaterrylene-3,4:13,14-tetracarboxylic diimide and N,N'-bis(2,6-diisopropylphenyl)-1,6,8,11,16,19-hexa(p-tert-octylphenoxy)quaterrylene-3,4:13,14-tetracarboxylic diimide.

EXAMPLE 3

Example 1 was repeated by reacting 28.6 g of a 1:1 mixture of N,N'-bis(2,6-diisopropylphenyl)-1,6,8,11,16,18-hexabromoquaterrylene-3,4:13,14-tetracarboxylic diimide and N,N'-bis(2,6-diisopropylphenyl)-1,6,8,11, 16,19-hexabromoquaterrylene-3,4:13,14-tetracarboxylic diimide with 20.6 g of p-tert-octylphenol and 6.9 g of potassium carbonate.

This afforded 27.6 g of a 1:1 mixture of N,N'-bis(2,6-diisopropylphenyl)-8,18-dibromo-1,6,11,16-tet ra(p-tert-octylphenoxy)quaterrylene-3,4:13, 14-tetracarboxylic diimide and N,N'-bis(2,6-diisopropylphenyl)-8,19-dibromo-1,6, 11,16-tetra(p-tert-octylphenoxy)quaterrylene-3,4:13,14-tetracarboxylic diimide in the form of a dark green crystalline powder, which corresponds to a yield of 71%.

In addition, the N-methylpyrrolidone mother liquor was diluted with four times the amount of a 1:1 mixture of methanol and water to afford 11 g (yield 25%) of the 1:1 mixture of N,N'-bis(2,6-diisopropylphenyl)-1,6,8, 11,16,18-hexa(p-tert-octylphenoxy)quaterrylene-3, 4:13,14- tetracarboxylic diimide and N,N'-bis(2,6-diisopropylphenyl)-1,6,8,11,16,19-hexa (p-tert-octylphenoxy)quaterrylene-3,4:13, 14-tetracarboxylic diimide of Example 1.

EXAMPLE 4

38.7 g of the 1:1 mixture of N,N'-bis(2,6-diisopropylphenyl)-8,18-dibromo-1,6,11,16-tet ra(p-tert-octylphenoxy)quaterrylene-3,4:13,14-tetra-carboxylic diimide and N,N'-bis(2,6-diisopropylphenyl)-8,19-dibromo-1,6,11,16-tetra(p-tert-octylphenoxy) quaterrylene-3,4:13,14-tetracarboxylic diimide were reacted with 10.7 g of p-tert-octylphenol and 3.32 g of potassium carbonate in 170 ml of N-methylpyrrolidone similarly to Example 1, except that the reaction time was extended to 18 h.

This afforded 39.5 g of a 1:1 mixture of N,N'-bis (2,6-diisopropylphenyl)-1,6,8,11,16,18-hexa(p-tert-octylphenoxy)quaterrylene-3,4:13,14-tetracarboxylic diimide and N,N'-bis(2,6-diisopropylphenyl)-1,6,8,11, 16,19-hexa(p-tert-octylphenoxy)quaterrylene-3,4:13,14-tetracarboxylic diimide in the form of a light green amorphous powder having a residual bromine content <0.05% by weight, which corresponds to a yield of 90%.

EXAMPLE 5

The 1:1 mixture of N,N'-bis(2,6-diisopropylphenyl)-8,18-dibromo-1,6,11,16-tetra(p-tert-octylphenoxy)quaterrylene-3,4:13,14-tetracarboxylic diimide and N,N'-bis(2,6-diisopropylphenyl)-8,19-dibromo-1,6,11,16-tetra(p-tert-octylphenoxy)quaterrylene-3,4:13,14-tetra-carboxylic diimide of Example 3 (hereinafter designated "Ia") was converted by dehalogenation into N,N'-bis(2,6-diisopropylphenyl)-1,6,11,16-tetra(p-tert-octylphenoxy) quaterrylene-3,4:13,14-tetracarboxylic diimide. The dehalogenation was conducted according to the following methods:
a) A mixture of 38.7 g of Ia and 600 ml of N-methylpyrrolidone was stirred under nitrogen and heated to 130° C., admixed with 6.75 g of potassium tert-butoxide and maintained at 130° C. for 1.5 h.

After cooling down to room temperature, the reaction product was precipitated by adding the reaction mixture to 2 liters of 5% by weight hydrochloric acid, filtered off, washed first with 5% by weight hydrochloric acid to colorless run-off and then with water to neutral run-off and dried at 100° C. under reduced pressure. The isolated reaction product was then subjected to column chromatography over silica gel using 1:1 toluene/hexane as mobile phase.

This afforded 20.0 g of N,N'-bis(2,6-diisopropylphenyl)-1,6,11,16-tetra(p-tert-octylphenoxy)quaterrylene-3,4:13,14-tetracarboxylic diimide in the form of a light green amorphous powder having a UV/VIS spectroscopic purity of >99% and a residual bromine content <0.01%, which corresponds to a yield of 56%.
b) Example 5a) was repeated, except that 4.1 g of potassium carbonate was used as base instead of potassium tert-butoxide. The workup and purification were likewise carried out similarly to Example 5a). This afforded 18.6 g of N,N'-bis(2,6-diisopropylphenyl)-1,6,11,16-tetra(p-tert-octylphenoxy)quaterrylene-3,4:13,14-tetracarboxylic diimide in the form of a light green amorphous powder having a purity of >99.5% and a residual bromine content of 0.00%, which corresponds to a yield of 52%.
C) A mixture of 38.7 g of Ia, 3.8 g of sodium borohydride, 0.46 g of tetrakis (triphenylphosphine)palladium(0) and 600 ml of dioxane was heated to 60° C. for 48 h while stirring in a nitrogen atmosphere.

After cooling down to room temperature, excess hydride was decomposed by gradual addition of 10 ml of water. The rest of the workup and purification were carried out similarly to Example 5a.

This afforded 21.7 g of N,N'-bis(2,6-diisopropylphenyl)-1,6,11,16-tetra(p-tert-octylphenoxy)quaterrylene-3,4:13,14-tetracarboxylic diimide in the form of a light green amorphous powder having a purity of >99% and a residual bromine content of 0.00%, which corresponds to a yield of 61%.
d) A mixture of 38.7 g of Ia, 3.8 g of sodium borohydride, 0.46 g of tetrakis (triphenylphosphine)palladium (0) and 1000 ml of acetonitrile was heated to 69° C. for 27 hours while stirring in a nitrogen atmosphere.

The rest of the workup and purification were carried out similarly to Example 5c.

The yield was 29.1 g (82%) of N,N'-bis(2,6-diisopropylphenyl)-1,6,11,16-tetra(p-tert-octylphenoxy) quaterrylene-3,4:13,14-tetracarboxylic diimide with a purity of >99% and a residual bromine content of 0.00%

Preparation of PVB Sheet Containing Quaterrylimides

EXAMPLE 6

The following were charged to a vessel which was then heated to 50° C. and stirred for 1 hour.

| Component | Amount (gm) |
|---|---|
| N,N'-bis(2,6-diisopropylphenyl) quaterrylene-3,4:13,14-tetracarboxylic diimide IR-absorber | 0.63 |
| triethyleneglycol di-2-ethylhexanoate | 855 |
| Tinuvin benzotriazole derivative (UV absorber) from Ciba Geigy Co. | 15.8 |
| magnesium 2-ethyl butyrate | 2.8 g |

Then 2250 g PVB resin from Solutia Inc. as Butvar B-79 was added and stirring was continued for about one min. to form a premix slurry.

The premix slurry was extruded using a Model KL-125 extruder (Killion Extruders, Inc.) with a single-screw configuration and a 1.25 inch (3.18 cm) screw diameter. The barrel temperature was maintained between 180 to 200° C. A seven inch (17.78 cm) wide slit die having a 0.029 inch (0.074 cm) gap and a die temperature of 190° C. was used. As the polymer film exited the die it was quenched in a water bath at 14° C. and was pulled by a roller which was speed controlled to result in a plasticized PVB interlayer sheet about 30 mil (0.76 mm) thick containing the quaterrylimide defined above uniformly dispersed throughout the formulation of the sheet.

The plasticized PVB interlayer sheet was interposed between 2 layers of clear float glass (PPG Industries, Inc.), each having a thickness of 2.1 mm, and the combination was placed in an autoclave where it was exposed to 135° C. and 12 kg/cm$^2$ pressure for about 60 minutes to form a glass laminate having visible light transmitting and infrared light absorbing properties.

EXAMPLE 7

A PVB sheet and laminate thereof were prepared in a manner similar to Example 6, except the quaterrylimide was replaced with 0.945 grams of a 1:1 mixture of N,N'-bis(2, 6-diisopropylphenyl)-1,6,8,11,16,18-hexa(p-tertoctylphenoxy)quaterrylene-3,4:13,14-tetracarboxylic diimide and N,N'-bis(2,6-diisopropylphenyl)-1,6,8,11,16,19-hexa(p-tert-octylphenoxy)quaterrylene-3,4:13,14-tetracarboxylic diimide.

EXAMPLE 8

A PVB sheet and laminate thereof were prepared in a manner similar to Example 6, except the quaterrylimide was replaced with 1.575 grams of N,N'-bis(2,6-diisopropylphenyl)-1,6,11,16-tetra(p-tert-octylphenoxy) quaterrylene-3,4:13,14-tetracarboxylic diimide.

EXAMPLE 9

A glass laminate was prepared in a manner similar to Example 7 except the interlayer was comprised of both a sheet of PVB containing the quaterrylimide as described in Example 7 in combination with a PVB sheet containing 100 nanometers or less doped metal oxide particles.

Ultrafine particles of antimony tin oxide were obtained from Sumitomo Osaka Cement Co. Ltd., 1 Mitoshirocho, Kanda, Chiyoda-Ku, Tokyo, Japan. These particles were <0.1 µm, preferably 0.05 µm, diameter or less in size and are believed prepared according to working Example 1 of Japanese Laid-Open Patent Application (Kokai) No. 8-217500 dated Aug. 27, 1996, of Sumitomo Osaka Cement, the disclosure of such Kokai being incorporated herein by reference. Antimony tin oxide powder of particle size <0.05 µm is also available from Nanophase Technologies Corp., 453 Commerce St., Burr Ridge, Ill.

More particularly, as disclosed in the noted Kokai, antimony chloride ($SbCl_3$) and hydrated tin chloride ($SnCl_4.5H_2O$) are dissolved in hydrochloric acid solution to which is then added 25% ammonia solution and the mixture allowed to react. The resulting sol-like dispersion is filtered and washed to remove ammonium chloride and in a sealed vessel heated to and kept at 350° C. for 5 hours after which steam is released resulting in cooling and a concentration of the contents to 25% solids dispersion of antimony tin oxide with an average particle diameter of about 0.05 µm (500 Å). Octadecylamine flocculant is added to the dispersion to form a flocculated precipitate which is filtered and dried at 100° C. for 2 hours to yield a powder which is tin oxide ($SnO2$) doped with about 9–10 weight percent (wt. %) antimony oxide ($Sb_2O_3$), hereinafter sometimes abbreviated ATO.

The ATO powder was mixed with and dispersed in toluene using an ultrasonic disperser. A minor amount (believed to be about 3 weight parts) of a 10% toluene solution of an anionic surfactant was added to and thoroughly mixed with the dispersion of the ATO particles. The surfactant functions to prevent excess agglomeration of the ATO particles, which after incorporation into the formulation of the PVB sheet in the absence of the surfactant could lead to excess undesirable haze in the finished glass laminates. 115 weight parts triethylene glycol di-2-ethyl hexanoate (3GEH) plasticizer was then added and the mixture was distilled under reduced pressure for 15 minutes at 95° C. to remove toluene. The liquid remaining is a 20% concentrate of ATO uniformly dispersed in 3GEH plasticizer.

The concentrate was further diluted with 3GEH to form a 0.8 wt. % diluted dispersion which was mixed with PVB resin from Solutia Inc. as Butvar B-79 and the other additives in amounts as follows:

| 19.152 gms | diluted ATO dispersion |
| 0.062 gms | magnesium di-2-ethyl butyrate |
| 50 gms | PVB resin |
| 0.173 gms | Tinuvin UV absorber |

A PVB sheet was compression molded from the above formulation and a four layer (glass-PVB-PVB-glass) glass laminate containing such sheet was formed.

The glass laminates of Examples 6–9 were tested according to the following procedures.

Results are in Table I following.
1) Visible Light Transmittance (Tv)—% light transmission over the visible wavelength range of 380 to 780 nanometers (nm) measured according to International Standards Organization (ISO) Designation 9050:1990(E), in illuminant D65, 10 degree observer.
2) Solar Direct Transmittance (Ts)—% solar energy transmittance over the spectral range of 350 to 2100 nanometers measured according to ISO Designation 9050: 1990 (E) using Air Mass 2 solar spectral distribution.
3) Pummel Adhesion (no units) measures PVB sheet interlayer adhesion to glass. Prepare two ply glass laminates as recited above, condition to minus 17° C. and manually pummel each with a 1 pound (454 g) hammer to break the glass. Remove all broken glass unadhered to the PVB sheet. Visually compare glass left adhered to the sheet with a set of standards of known pummel scale, the higher the number of the standard, the more glass remaining adhered to the sheet—i.e. at pummel zero no glass is adhered and at pummel 10 100% of the sheet surface is adhered. Desirable impact dissipation occurs at a pummel adhesion value of 3 to 7. At less than 3 too much glass is lost whereas at more than 7 adhesion is generally too high and shock absorption poor.
4) Haze (%)—according to ASTM Designation D1003-97—Procedure A using a hazemeter. Values <3% considered acceptable.

TABLE 1

| Example | (Absorber conc.) (wt %) | TV | TS | Pummel Adhesion | Haze % |
|---|---|---|---|---|---|
| 6 | 0.020 | 70 | 53 | 4 | N/A |
| 7 | 0.030 | 79 | 55 | 5 | 1.50 |
| 8 | 0.050 | 72 | 44 | 6 | 0.6 |
| 9 | 0.030/0.22* | 71 | 43 | 5/8** | 0.73 |

*concentration of quaterrylimide and ATO, respectively
**pummel adhesion measured on each sheet

EXAMPLE 10

A PVB sheet and laminate thereof are prepared in a manner similar to Example 6, except the quaterrylimide is replaced with 1.575 grams of N,N'-bis(2,6-diisopropylphenyl)tetra(4-tert-butylphenoxy) quaterrylene-3,4:13,14-tetracarboxylic diimide.

EXAMPLE 11

A PVB sheet and laminate thereof are prepared in a manner similar to Example 6, except the quaterrylimide is replaced with 0.63 grams of N,N'-bis(dodecyl) quaterrylene-3,4:13,14-tetracarboxylic diimide.

EXAMPLE 12

A PVB sheet and laminate thereof are prepared in a manner similar to Example 6, except the quaterrylimide is replaced with 0.63 grams of N,N'-bis(cyclohexyl) quaterrylene-3,4:13,14-tetracarboxylic diimide.

Colorants Added to a PVB Sheet Containing Quaterrylimides

EXAMPLE 13

An IR absorbing dye was added to a PVB sheet that was prepared in a manner similar to Example 8, except that the IR absorber concentration was 0.032 wt. % of the total weight of the sheet. Pigments were also added. C.I. pigment blue 15 was added at a concentration of 0.00128 wt. % and C.I. pigment red was added at a concentration of 0.00038 wt. %. The concentrations are based upon the total weight of the sheet. A green color was produced by including the colorants. The green colored PVB sheet was placed between two clear glass sheets forming a green colored laminate. Each clear glass sheet had a thickness in the range of 2.1 to 2.3 mm. Using the CIELAB System, the green colored laminate had L*, a*, and b* coordinates that were determined to be:

L*=87.6, a*=−20.0, and b*=2.0.

EXAMPLE 14

An IR absorbing dye was added to a PVB sheet that was prepared in a manner similar to Example 8, except that the IR absorber concentration was 0.0435 wt. % of the total weight of the sheet. Pigments were also added. C.I. pigment blue 15 was added at a concentration of 0.00315 wt. %, along with C.I. pigment red 209 at a concentration of 0.01867 wt. %, and carbon black at a concentration of 0.00050 wt. %. All concentrations are based upon the total weight of the sheet. A gray color was produced by including the colorants. The PVB sheet was placed between two clear glass sheets forming a gray colored laminate. Each clear glass sheet had a thickness in the range of 2.1 to 2.3 mm. Using the CIELAB System, the L*, a*, and b* coordinates were determined to be:

L*=73.1, a*=−2.8, and b*=−3.8, for the gray colored laminate.

The preceding description is for illustration and should not be taken as limiting. Various modifications and alterations will be readily suggested to persons skilled in the art. It is intended, therefore, that the foregoing be considered exemplary only and that the scope of the invention be ascertained from the following claims.

In the claims:

1. Plasticized polyvinyl butyral sheet containing an infrared-absorbing effective amount of at least one quaterrylenetetracarboxylic diimide infrared-absorbing additive dispersed therein of formula I:

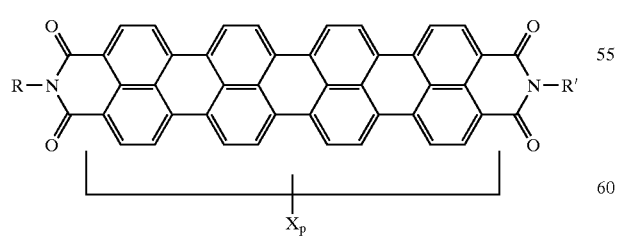

wherein

R and R' are independently $C_1$–$C_{30}$-alkyl whose carbon chain optionally is interrupted by one or more of —O—, —S—, —$NR^1$—, —CO— and/or —$SO_2$— and which optionally is monosubstituted or polysubstituted by cyano, $C_1$–$C_6$-alkoxy or a 5-, 6- or 7-membered heterocyclic radical which is attached via a nitrogen atom and which optionally contains additional heteroatoms and optionally is aromatic;

$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; or aryl or hetaryl, each of which optionally is monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which optionally is substituted by $C_1$–$C_{10}$-alkyl, $C_1$–$C_6$-alkoxy or halogen, where $R^1$ is hydrogen or $C_1$–$C_6$-alkyl; and $R^2$ is hydrogen; $C_1$–$C_{18}$-alkyl; aryl or hetaryl, each of which optionally is substituted by $C_1$–$C_6$-alkyl, $C_1$–$C_6$-alkoxy, halogen or cyano;

X is

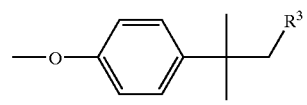

where $R^3$ is $C_1$–$C_8$-alkyl, whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic; or $C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl;

and p is from 1–16.

2. The sheet of claim 1, wherein p is 2-8.

3. The sheet of claim 2 wherein $R^3$ is selected from the group consisting of:

methyl, ethyl, propyl, isopropyl, butyl, isobutyl, tert-butyl, pentyl, isopentyl, neopentyl, hexyl, 2-methylpentyl, tert-pentyl, heptyl, 1-ethylpentyl, octyl, 2-ethylhexyl and isooctyl;

2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl and 3,6,9-trioxaundecyl;

2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 4,7-dithiaoctyl, 4,7-dithianonyl, 2- and 4-butylthiobutyl, 4,8-dithiadecyl, 3,6,9-trithiadecyl and 3,6,9-trithiaundecyl;

2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-monomethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl and 3,6,9-trimethyl-3,6,9-triazaundecyl;

propan-2-on-1-yl, butan-3-on-1-yl, butan-3-on-2-yl and 2-ethylpentan-3-on-1-yl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

cyclopentyl, 2- and 3-methylcyclopentyl, 2- and 3-ethylcyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and S-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl.

4. The sheet of claim 3, wherein R and R' are independently selected from the group consisting of:

$C_6$–$C_{30}$-alkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic;

$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; and aryl or hetaryl which may be monosubstituted or polysubstituted by $C_1$–$C_{18}$-alkyl, $C_1$–$C_6$-alkoxy, cyano, —CONH—$R^1$ and/or —NH—$COR^1$.

5. The sheet of claim 2, wherein $R^3$ is selected from the group consisting of methyl, ethyl, propyl, n-butyl, tert-butyl, cyclopentyl, cyclohexyl, cycloheptyl, 4-morpholinyl or mixtures thereof.

6. The sheet of claim 1, wherein R is 2,6-diisopropylphenyl.

7. The sheet of claim 1, wherein said sheet is further comprised of an infrared-absorbing effective amount of an inorganic infrared-absorbing additive.

8. The sheet of claim 1, wherein said sheet further comprises an ultraviolet light stabilizer.

9. The sheet of claim 1, wherein said sheet further comprises a colorant.

10. The sheet of claim 1, wherein said sheet exhibits a color selected from the group consisting of green and gray, wherein said green color is defined by the CIELAB system, having an L* value from about 76.0 to about 94.0, an a* value from about –38.0 to about –8.0, and a b* value from about –5.0 to about 7.0, and wherein said gray color is defined by the CIELAB system, having an L* value from about 59.0 to about 87.0, an a* value from about –7.0 to about 3.0, and a b* value from about –8.0 to about 2.0.

11. Plasticized polyvinyl butyral sheet containing an infrared-absorbing effective amount of at least one tert-alkylphenoxy-substituted quaterrylenetetra-carboxylic diimide infrared absorbing additive dispersed therein of formula II:

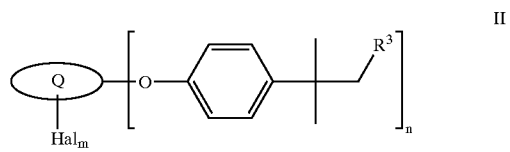

where

Q is a N,N'-disubstituted quaterrylene-3,4:13,14-tetracarboxylic diimide radical;

$R^3$ is $C_1$–$C_8$-alkyl, whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic; or $C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl;

Hal is chloro and/or bromo;

m is from 0 to 15; and n is from 1 to 16, subject to the proviso that the sum m+n is ≦16.

12. The sheet of claim 11, wherein said sheet exhibits a color selected from the group consisting of green and gray, wherein said green color is defined by the CIELAB system, having an L* value from about 76.0 to about 94.0, an a* value from about –38.0 to about –8.0, and a b* value from about –5.0 to about 7.0, and wherein said gray color is defined by the CIELAB system, having an L* value from about 59.0 to about 87.0, an a* value from about –7.0 to about 3.0, and a b* value from about –8.0 to about 2.0.

13. A multilayered plasticized polyvinyl butyral sheet having (a) a first sheet containing an infrared-absorbing effective amount of at least one quaterrylenetetracarboxylic diimide infrared absorbing additive dispersed therein of formula I:

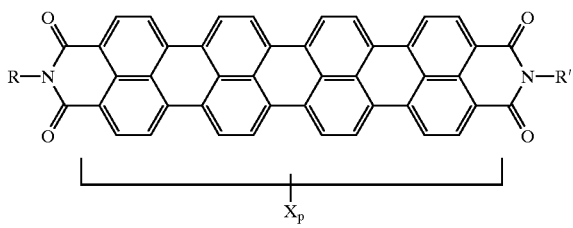

wherein
R and R' are independently $C_1$–$C_{30}$-alkyl whose carbon chain optionally is interrupted by one or more of —O—, —S—, —$NR^1$—, —CO— and/or —$SO_2$— and which optionally is monosubstituted or polysubstituted by cyano, $C_1$–$C_6$-alkoxy or a 5-, 6- or 7-membered heterocyclic radical which is attached via a nitrogen atom and which optionally contains additional heteroatoms and optionally is aromatic;
$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; or
aryl or hetaryl, each of which optionally is monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which optionally is substituted by $C_1$–$C_{10}$-alkyl, $C_1$–$C_6$-alkoxy or halogen, where $R^1$ is hydrogen or $C_1$–$C_6$-alkyl; and
$R^2$ is hydrogen; $C_1$–$C_{18}$-alkyl; aryl or hetaryl, each of which optionally is substituted by $C_1$–$C_6$-alkyl, $C_1$–$C_6$-alkoxy, halogen or cyano;
X is

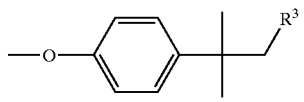

where
$R^3$ is $C_1$–$C_8$-alkyl, whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic; or
$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl;
and p is from 1–16; and
b) a second sheet having an infrared-absorbing effective amount of an inorganic infrared-absorbing additive.

14. The sheet of claim 13, wherein said sheet exhibits a color selected from the group consisting of: green and gray, wherein said green color is defined by the CIELAB system, having an L* value from about 76.0 to about 94.0, an a* value from about −38.0 to about −8.0, and a b* value from about −5.0 to about 7.0, and wherein said gray color is defined by the CIELAB system, having an L* value from about 59.0 to about 87.0, an a* value from about −7.0 to about 3.0, and a b* value from about −8.0 to about 2.0.

15. The sheet of claim 13, wherein the inorganic infrared-absorbing additive is lanthanum hexaboride.

16. A laminate having visible light transmitting and infrared light absorbing properties comprising two glass sheets with a plasticized polyvinyl butyral sheet between the sheets of glass, said plasticized polyvinyl butyral sheet containing an infrared-absorbing effective amount of at least one quaterrylenetetracarboxylic diimide infrared-absorbing additive dispersed therein of formula I:

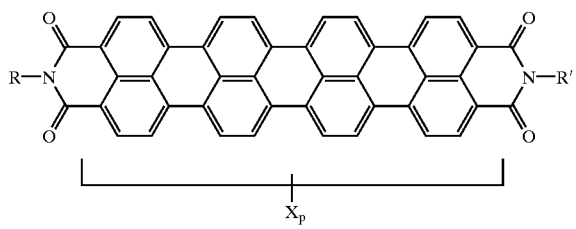

wherein
R and R' are independently $C_1$–$C_{30}$-alkyl whose carbon chain optionally is interrupted by one or more of —O—, —S—, —$NR^1$—, —CO— and/or —$SO_2$— and which optionally is monosubstituted or polysubstituted by cyano, $C_1$–$C_6$-alkoxy or a 5-, 6- or 7-membered heterocyclic radical which is attached via a nitrogen atom and which optionally contains additional heteroatoms and optionally is aromatic;
$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl; or
aryl or hetaryl, each of which optionally is monosubstituted or polysubstituted by $C_1$–$C_{18}$-alkyl, $C_1$–$C_6$-alkoxy, cyano, —$CONHR^2$, —$NHCOR^2$ and/or aryl- or hetarylazo, each of which optionally is substituted by $C_1$–$C_{10}$-alkyl, $C_1$–$C_6$-alkoxy or halogen, where $R^1$ is hydrogen or $C_1$–$C_6$-alkyl; and
$R^2$ is hydrogen; $C_1$–$C_{18}$-alkyl; aryl or hetaryl, each of which optionally is substituted by $C_1$–$C_6$-alkyl, $C_1$–$C_6$-alkoxy, halogen or cyano;
X is

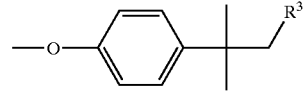

where
$R^3$ is $C_1$–$C_8$-alkyl, whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkoxy or by a 5- to 7-membered heterocyclic radical which is attached via a nitrogen atom and may contain further heteroatoms and be aromatic; or
$C_5$–$C_8$-cycloalkyl whose carbon chain may be interrupted by one or more groups selected from the group consisting of —O—, —S—, —$NR^1$—, —CO— and/or —$SO_2$— and which may be monosubstituted or polysubstituted by $C_1$–$C_6$-alkyl;
and p is from 1–16.

17. The laminate of claim 16, wherein said laminate exhibits a color elected from the group consisting of: green and gray, wherein said green color is defined by the CIELAB system, having an $L^*$ value from about 76.0 to about 94.0, an $a^*$ value from about −38.0 to about −8.0, and a $b^*$ value from about −5.0 to about 7.0, and wherein said gray color is defined by the CIELAB system, having an $L^*$ value from about 59.0 to about 87.0, an $a^*$ value from about −7.0 to about 3.0, and a $b^*$ value from about −8.0 to about 2.0.

18. The laminate of claim 16, having a plasticized polyvinyl butyral sheet thickness of about 0.76 mm, more than 70% visible light transmittance and less than 45% direct solar transmittance measured according to ISO designation 9050:1990 (E) using Air Mass 2 solar spectral distribution.

19. The laminate of claim 16, further comprising a second sheet of plasticized polyvinyl butyral sheet disposed between said sheets of glass, wherein said second sheet of plasticized polyvinyl butyral sheet contains an infrared-absorbing effective amount of at least one inorganic infrared-absorbing additive.

20. The laminate of claim 19, wherein the inorganic infrared-absorbing additive is lanthanum hexaboride.

21. The laminate of claim 16, wherein at least one of said glass sheets is an infrared absorbing glass sheet.

22. The laminate of claim 16, further comprising a second sheet of plasticized polyvinyl butyral sheet disposed between said sheets of glass and an infrared reflective layer disposed between said sheets of plasticized polyvinyl butyral.

23. The laminate of claim 16, wherein at least one of said glass sheets is an infrared reflective coated glass.

24. Plasticized polyvinyl butyral sheet containing an infrared-absorbing effective amount of at least one tert-alkylphenoxy-substituted quaterrylene tetracarboxylic diimide infrared absorbing additive selected from the group consisting of N,N'-bis(2,6-diisopropylphenyl)-1,6,11,16-tetra(p-tert-octylphenoxy) quaterrylene-3,4:13,14-tetracarboxylic diimide, N,N'-bis(2,6-diisopropylphenyl)-1,6,11,16-tetraphenoxyquaterrylene-3,4:13,14-tetracarboxylic diimide, N,N'-bis(2,6-diisopropylphenyl)-1,6,8,11,16,19-hexa(p-tert-octylphenoxy)quaterrylene-3,4:13,14-tetracarboxylic diimide, N,N'-bis(2,6-diisopropylphenyl)-1,6,8,11,16,18-hexa(p-tert-octylphenoxy)quaterrylene-3,4:13,14-tetracarboxylic diimide or a mixture thereof.

25. The sheet of claim 24, wherein said sheet exhibits a color selected from the group consisting of: green and gray, wherein said green color is defined by the CIELAB system, having an $L^*$ value from about 76.0 to about 94.0, an $a^*$ value from about −38.0 to about −8.0, and a $b^*$ value from about −5.0 to about 7.0, and wherein said gray color is defined by the CIELAB system, having an $L^*$ value from about 59.0 to about 87.0, an $a^*$ value from about −7.0 to about 3.0, and a $b^*$ value from about −8.0 to about 2.0.

* * * * *